United States Patent
Droege et al.

(10) Patent No.: US 12,530,631 B2
(45) Date of Patent: Jan. 20, 2026

(54) AUTOMATED COMMERCIAL PARKING AUTHENTICATION

(71) Applicant: Relay Payments, Inc., Atlanta, GA (US)

(72) Inventors: James Ryan Droege, Atlanta, GA (US); Spencer Barkoff, Atlanta, GA (US); Sergii Koval, Atlanta, GA (US)

(73) Assignee: Relay Payments, Inc., Atlanta, GA (US)

( * ) Notice: Subject to any disclaimer, the term of this patent is extended or adjusted under 35 U.S.C. 154(b) by 424 days.

(21) Appl. No.: 18/333,478

(22) Filed: Jun. 12, 2023

(65) Prior Publication Data
US 2024/0412118 A1    Dec. 12, 2024

(51) Int. Cl.
| | |
|---|---|
| *G06Q 10/02* | (2012.01) |
| *G06Q 20/10* | (2012.01) |
| *G06Q 30/0283* | (2023.01) |
| *G07B 15/00* | (2011.01) |
| *G07C 9/10* | (2020.01) |

(52) U.S. Cl.
CPC ........... *G06Q 10/02* (2013.01); *G06Q 20/102* (2013.01); *G06Q 30/0284* (2013.01); *G07B 15/00* (2013.01); *G06Q 2240/00* (2013.01); *G07C 9/10* (2020.01)

(58) Field of Classification Search
CPC .. G06Q 10/02; G06Q 2240/00; G06Q 10/083; G07B 15/00; G07C 9/10
See application file for complete search history.

(56) References Cited

U.S. PATENT DOCUMENTS

| | | | | |
|---|---|---|---|---|
| 2018/0096263 | A1* | 4/2018 | Modi | G07B 15/00 |
| 2020/0104790 | A1* | 4/2020 | Chung | H04W 4/029 |
| 2021/0209519 | A1* | 7/2021 | Baskin | G06Q 10/00 |
| 2022/0392271 | A1* | 12/2022 | Vossoughi | G06T 7/70 |

OTHER PUBLICATIONS

Relay Payments introduces RelayGo, https://www.relaypayments.com/newsroom/relay-payments-introduces-relaygo-pr, Mar. 17, 2022 (Year: 2022).*

Munholland, Savannah, "What is the best truck parking app?," https://ratings.freightwaves.com/best-truck-parking-app/, Mar. 30, 2023 (Year: 2023).*

Cekala, Tadeusz, Zbigniew Telec, and Bogdan Trawiński. "Truck loading schedule optimization using genetic algorithm for yard management." Asian Conference on Intelligent Information and Database Systems. Cham: Springer International Publishing, 2015. (Year: 2015).*

* cited by examiner

*Primary Examiner* — Emmett K. Walsh
(74) *Attorney, Agent, or Firm* — Eversheds Sutherland (US) LLP

(57) ABSTRACT

Systems, methods, and computer-readable media are disclosed for automated commercial parking authentication. In one embodiment, a method can include determining a first request to park a tractor and a trailer, determining that a commercial parking site has a first available parking location for the tractor and the trailer, and causing presentation of a request to confirm a first parking reservation at a device associated with the first request, where the first parking reservation comprises a first cost associated with the first available parking location. The method may include determining that the first parking reservation is confirmed, determining that the device is present at the commercial parking site, and automatically approving access to the commercial parking site.

18 Claims, 13 Drawing Sheets

AUTOMATED COMMERCIAL PARKING AUTHENTICATION

BACKGROUND

Commercial parking sites may be parking sites for commercial vehicles, such as semi-trailer trucks, trailers, freight, and other types of commercial vehicles. During transport by road, drivers of such commercial vehicles may desire to park one or more vehicles. For example, a driver may desire to park a commercial vehicle during an overnight period to sleep. Commercial parking sites may vary greatly as to the types of features present, such as power connections, whether the site is paved, and so forth. Moreover, commercial parking sites may not be arranged like typical parking lots or sites with clear lines designating parking spaces. In addition, commercial parking site access and corresponding payments may rely on manual processes that are initiated by phone call, where the driver may not be able to reach a site operator at certain times. Accordingly, automated commercial parking site and inventory management may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
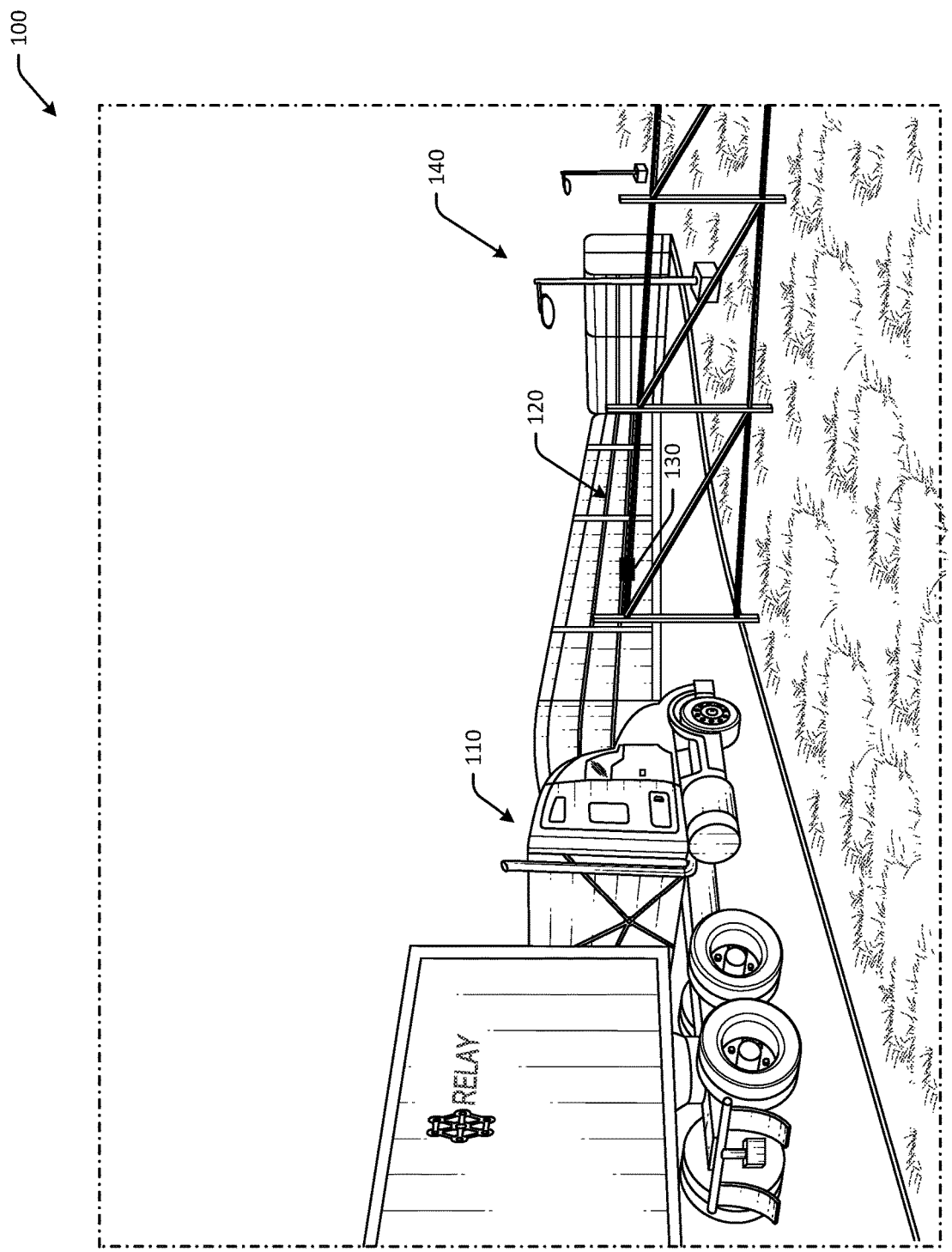
FIGS. 1A-1B are schematic illustrations of an example use case for automated commercial parking site and inventory management in accordance with one or more example embodiments of the disclosure.

Commercial parking sites may be parking sites for commercial vehicles, such as semi-trailer trucks, trailers, freight, and other types of commercial vehicles. Commercial parking sites may include dirt lots, gas stations, yards, paved lots, fields, and other areas where commercial vehicles and/or freight can be stored. Commercial parking sites may have labeled or unlabeled parking areas. Commercial parking sites may be used by drivers, such as semi-trailer truck drivers, during rest periods, to store empty freight containers, and so forth. However, typically, drivers may be unaware of most commercial parking sites that are located along a particular route. Instead, drivers may rely on the same commercial parking sites that are used by others or communicated via word of mouth. This results in overcrowding at popular commercial parking sites and, in some instances, causes drivers to park illegally or in unsafe locations along on or off ramps to highways. In many instances, additional commercial parking sites are located nearby, but the drivers may be unaware. Moreover, current processes for accessing private commercial parking sites are manual in that the driver calls the site operator, negotiates a payment for a particular amount of time, and then waits for the operator to provide access to the site, such as by removing a padlock. If the operator is unavailable or late, the driver must wait or find another parking site. The operator may also verbally communicate in which area of the commercial parking site the driver is to park, but the operator may be unable to verify compliance with the verbal instructions. In many instances, commercial parking sites may not have markings or clearly designated parking areas, unlike consumer parking lots.

Embodiments of the disclosure include automated commercial parking site and inventory management, where commercial parking sites can be digitally modeled to create virtually marked zones or parking areas, and such parking sites can be reserved and used by drivers in an automated process. In addition, access to commercial parking sites can be automated, such that commercial parking sites can be accessed at any time. Moreover, authentication and/or verification of parking can be automated, where certain embodiments can automatically confirm that a particular vehicle and/or container is parked in the correct area in a commercial parking site for the correct length of time. Certain embodiments may automatically adjust reservation costs for instances where the vehicle and/or components that are parked differ from a reservation and/or park for a different length of time than that associated with a parking reservation. Certain embodiments may automatically determine available parking inventory, thereby avoiding overcrowding issues and the need for illegal parking. To determine available parking inventory, certain embodiments may ingest parking site modeling data to determine a total number of parking locations, and reconcile such data with current reservations, pending reservations, and/or authentication data that may be determined in real-time. Embodiments can therefore allow for automated parking site and inventory management.

This disclosure relates to, among other things, devices, systems, methods, computer-readable media, techniques, and methodologies for automated commercial parking site and inventory management. In some instances, machine learning (e.g., deep neural networks, etc.) may be used to determine optimized parking site locations and routing (e.g., which drivers or vehicles to send to different parking sites, etc.), optimized parking locations within a parking site to maximize usage, and so forth. A feedback loop may be used to continually improve accuracy of the machine learning model(s), which may include feedback from customers, operators, or other users.

Figure 1B:
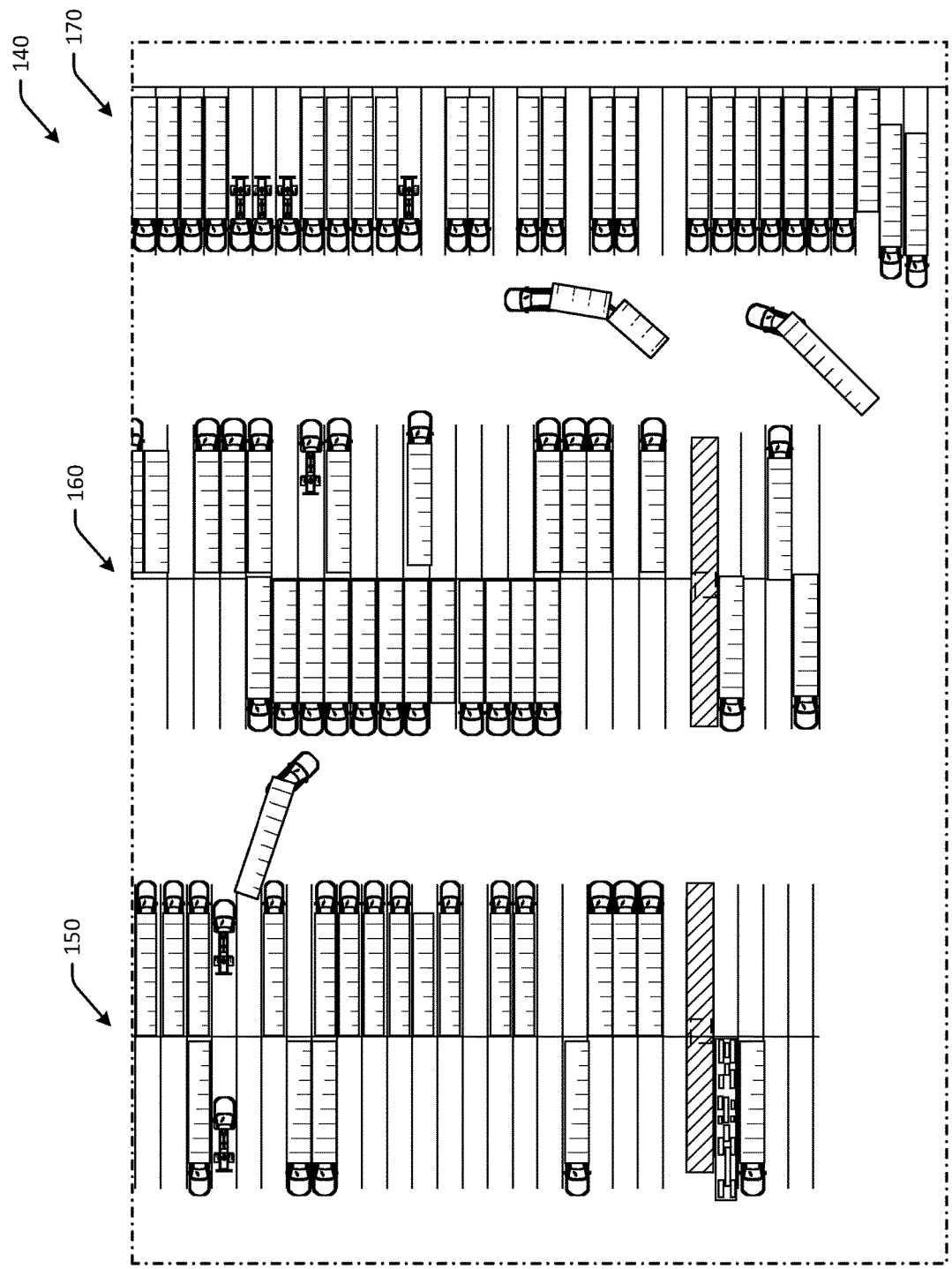

Referring to FIGS. 1A-1B, an example use case 100 for automated commercial parking site and inventory management is depicted in FIGS. 1A-1B in accordance with one or more example embodiments of the disclosure. FIG. 1A depicts a semi-trailer truck automatically accessing a commercial parking site and FIG. 1B depicts an example virtually modeled layout of the commercial parking site. Other embodiments may have different layouts.

In FIG. 1A, a driver of a semi-truck trailer 110 may desire to park the semi-truck trailer at a commercial parking site. For example, the driver may be driving and decide to stop for the night. The driver may make a parking reservation at a nearby commercial parking site and may use a mobile device to locate nearby commercial parking sites with available inventory. The driver may be presented with parking rates, parking site features, and so forth. The driver may select a commercial parking site at which to park the semi-truck trailer 110. For example, the driver may select commercial parking site 140 to park the semi-truck trailer 110. Instead of making a phone call to coordinate the parking reservation and access to the commercial parking site 140, the driver may complete the process online and/or using a mobile device.

As the semi-truck trailer 110 approaches the commercial parking site 140, the semi-truck trailer 110 may encounter an automated gate 120. The gate 120 may be any suitable type of gate, such as a cattle gate, a sliding gate, a raising gate, and so forth. One or more sensors 130 may be coupled to the gate 120. The sensors 120 may detect the presence of the mobile device of the user. In some instances, short range communication (e.g., Bluetooth, NFC, etc.) may be used to detect the mobile device, whereas in other instances, geofencing or other device location-based features may be used to determine whether the mobile device is within a certain distance of the gate 120. In some embodiments, the sensor 120 or another sensor, such as a camera, may be used to determine what type of vehicle and/or freight is at the gate 120 prior to authorizing access. For example, the sensor 120 may be used to capture data used to determine that the vehicle and/or freight matches the associated parking reservation. Such data may be wirelessly communicated to one or more remote servers to determine whether to automatically grant access to the commercial parking site 140. If the reservation associated with the mobile device is valid and the vehicle/freight matches the reservation, the remote server may cause the gate 120 to automatically open. In other embodiments, access may be granted based at least in part on identification of the vehicle and/or freight instead of, or in addition to, presence of a mobile device.

Accordingly, the gate 120 may slide open and the semi-truck trailer 110 may enter the commercial parking site 140. The semi-truck trailer 120 may park at a predetermined location (e.g., a parking location number, etc.), or for some sites, in a particular zone wherever space is available. Depending on the size of the parking site and the arrangement of zones, the remote server may assign a particular parking location to the semi-truck trailer 110, or may assign a zone to the semi-truck trailer and allow the driver to park anywhere within the zone.

As depicted in FIG. 1B, the commercial parking site 140 may have a first zone 150, a second zone 160, a third zone 170, and so forth. Although depicted with lines demarcating particular parking locations, such lines may not be present in the actual parking site, and instead may be virtually modeled and used by the remote server to determine total inventory and available inventory based on current occupancy levels. In some embodiments, one or more additional sensors, such as cameras, may be used to determine whether vehicles are parked in the correct location within the commercial parking site 140, as well as to determine available inventory based on occupied parking locations. In addition, as vehicles and/or freight is moved into and out of the commercial parking site 140, automated adjustments to parking rates may be implemented as needed, without manual intervention.

Example embodiments of the disclosure provide a number of technical features or technical effects. For example, in accordance with example embodiments of the disclosure, certain embodiments of the disclosure may automatically manage access to commercial parking sites via causing gates or other access barriers to open and close. Certain embodiments may be configured to provide real-time available inventory to drivers that can be used to create parking reservations and subsequently provide automated access for a given time period. Some embodiments allow for authentication and/or verification of compliance that a vehicle is parked in the assigned location and/or zone. As a result of improved functionality, manual efforts may be redirected to other tasks. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
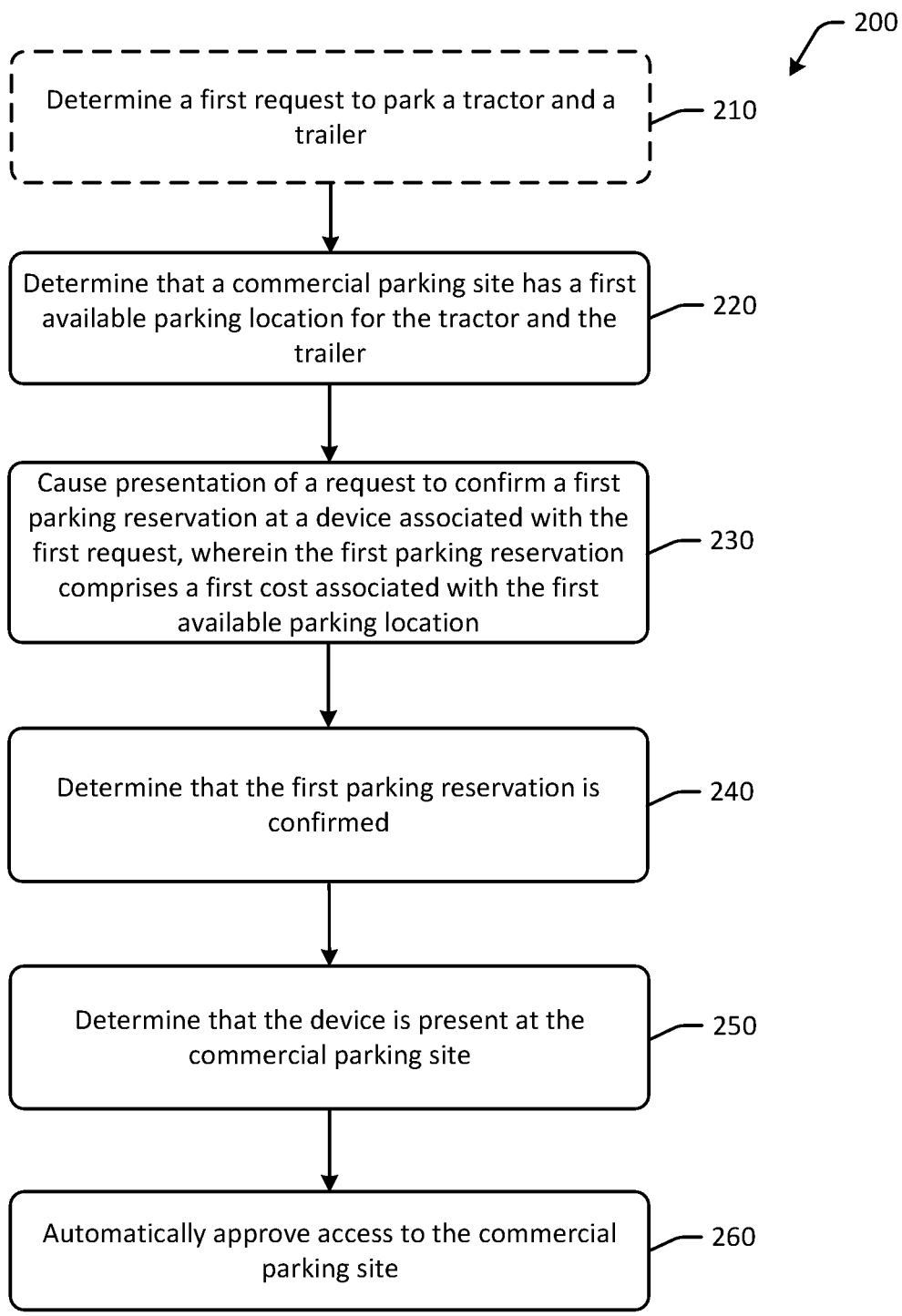
FIG. 2 is a schematic illustration of an example process flow for automated commercial parking site management in accordance with one or more example embodiments of the disclosure.

FIG. 2 depicts an example process flow 200 for automated commercial parking site management in accordance with one or more example embodiments of the disclosure. While example embodiments of the disclosure may be described in the context of tractors and trailers, it should be appreciated that the disclosure is more broadly applicable to any type of commercial equipment parking. Some or all of the blocks of the process flows in this disclosure may be performed in a distributed manner across any number of devices. The operations of the process flow 200 may be optional and may be performed in a different order.

At optional block 210 of the process flow 200, computer-executable instructions stored on a memory of a device, such as a remote server or a user device, may be executed to determine a first request to park a tractor and a trailer. For example, a remote server may determine a first request to park a tractor and a trailer. In some embodiments, the remote server may receive a first request to park a commercial vehicle, such as a tractor, a trailer, farm equipment, containers, or other commercial equipment. In some embodiments, the first request may include user device and/or vehicle location data indicating a current location of the user device or vehicle, and may include a direction of travel and/or destination associated with the user device or vehicle.

At block 220 of the process flow 200, computer-executable instructions stored on a memory of a device may be executed to determine that a commercial parking site has a first available parking location for the tractor and the trailer. For example, a remote server may determine that a commercial parking site has a first available parking location for the tractor and the trailer. To determine that a particular commercial parking site has available inventory at which the tractor and trailer can be parked, the remote server may determine a set of candidate commercial parking sites within a certain distance of the user device location (or future location based on direction of travel) and/or destination. In some embodiments, sites may be determined for future reservations and may not consider current user device location (e.g., reservations made 24 hours in advance, etc.). The remote server may determine current available inventory at the commercial parking site, and may determine that there is space to park the tractor and trailer.

At block 230 of the process flow 200, computer-executable instructions stored on a memory of a device may be executed to cause presentation of a request to confirm a first parking reservation at a device associated with the first request, wherein the first parking reservation comprises a first cost associated with the first available parking location. For example, a remote server may cause presentation of a request to confirm a first parking reservation at a device associated with the first request, wherein the first parking reservation comprises a first cost associated with the first available parking location. The parking site may be presented to the user at a user device, and the user may confirm that a parking reservation is desired. The parking reservation may include pricing for parking the tractor and trailer at the commercial parking site for a predetermined length of time. Pricing may be dynamically determined, in that factors such as commercial parking site utilization values, maximum yield per acreage metrics, current or inbound weather conditions (e.g., rain may cause prices to increase, etc.), and other factors may be used to determine the pricing and/or cost for a particular reservation.

In some embodiments, the remote server may determine more than one option for the user to choose from. For example, the commercial parking site may be a first commercial parking site, and the remote server may determine that a second commercial parking site has a second available parking location for the tractor and the trailer. The remote server may cause presentation of a second cost associated with the second available parking location at the device.

At block 240, computer-executable instructions stored on a memory of a device may be executed to determine that the first parking reservation is confirmed. For example, the remote server may determine that the first parking reservation is confirmed. The first parking reservation may be confirmed via interaction with the user device by the user.

At block 250, computer-executable instructions stored on a memory of a device may be executed to determine that the device is present at the commercial parking site. For example, the remote server may determine that the device is present at the commercial parking site. In some embodiments, the device may be determined to be present by scanning a code at the parking site, whereas in other embodiments, geofencing or geolocation of the user device may be used to determine that the device is within a predetermined distance of the parking site. In other embodiments, the tractor and/or trailer may be determined to be at the commercial parking site instead of, or in addition to, the user device. For example, one or more cameras may be used to capture images of the tractor and trailer. The images may be analyzed to identify the tractor and trailer, and determine a corresponding parking reservation. Analysis of images may include processing images using one or more object recognition algorithms, determining pixel color values, comparing certain portions of frames to previous or subsequent images in a video, and the like.

At block 260, computer-executable instructions stored on a memory of a device may be executed to automatically approve access to the commercial parking site. For example, the remote server may automatically approve access to the commercial parking site. In some embodiments, the remote server may determine that the user device and/or identified vehicle/trailer is associated with a valid parking reservation, and may cause a gate or other barrier to automatically open and allow the tractor and trailer to enter. In some embodiments, the remote server may determine a parking spot identifier associated with the first available parking location, and cause presentation of the parking spot identifier at the device, such that the user knows where to park upon entering the commercial parking site.

Figure 3:
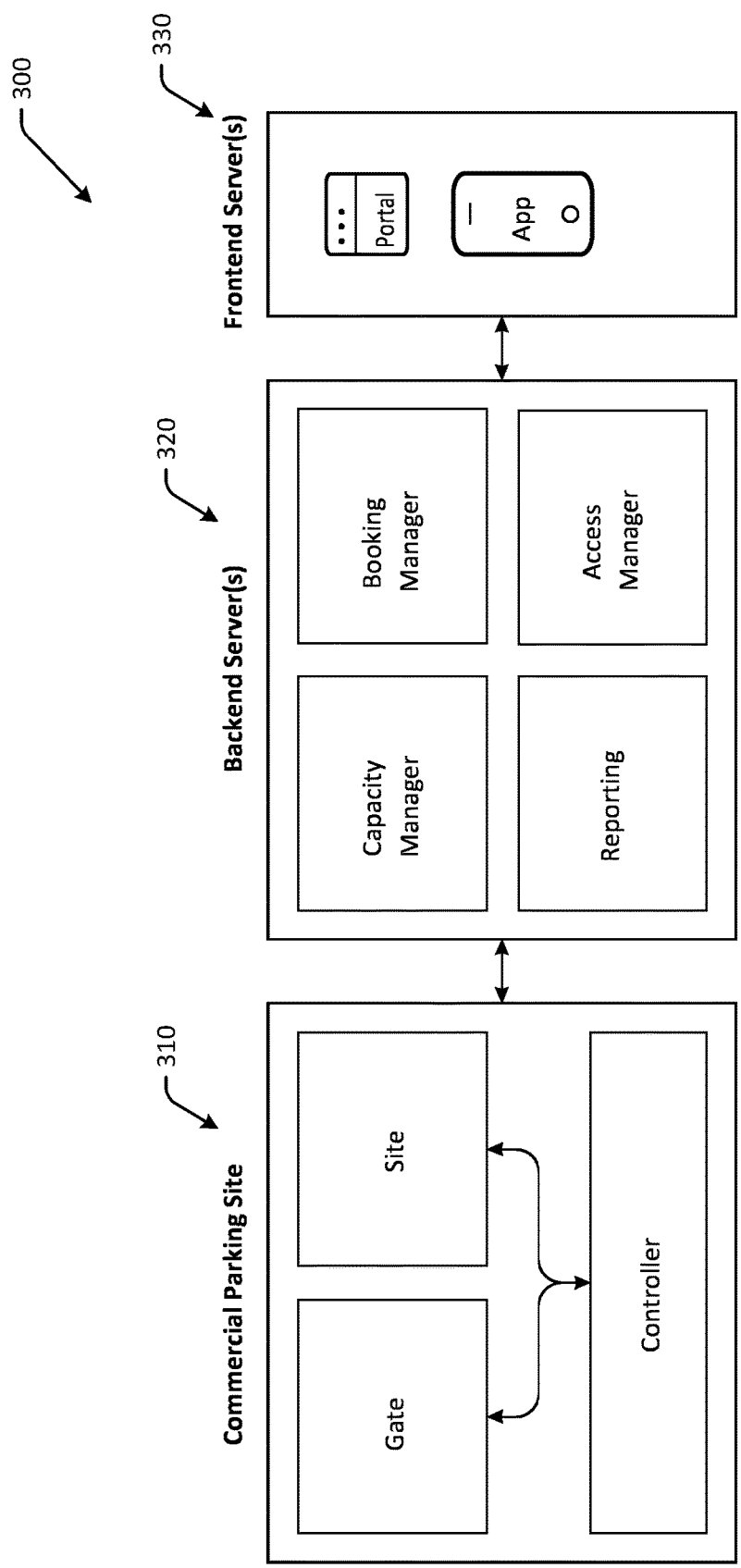
FIG. 3 is a schematic illustration of example system architecture for automated commercial parking site and inventory management in accordance with one or more example embodiments of the disclosure.

FIG. 3 is a schematic illustration of example system architecture 300 for automated commercial parking site and inventory management in accordance with one or more example embodiments of the disclosure. Other embodiments may have different architectures and/or include additional, fewer, or different components.

In FIG. 3, the system architecture 300 may include a first system 310 that is present at a commercial parking site, a second system 320 that includes one or more remote servers or backend servers, and a third system 330 that includes one or more remote servers or frontend servers.

At the commercial parking site, the first system 310 may include a local controller that is in communication with second system 320 and/or the third system 330. The local controller may further be configured to control access to the parking site via opening and/or closing a gate or other access barrier.

The second system 320 may include one or more computer-executable modules, such as a capacity manager, a booking manager, a reporting module, and an access manager. Other embodiments may include additional, fewer, or different modules. The capacity manager may be configured to determine total inventory for a particular parking site (which may include generating virtual models of a parking site), available inventory for a particular parking site, and so forth. The booking manager may be configured to determine pricing associated with a particular commercial parking site for different permutations (e.g., timing, length of reservation, available inventory, type of vehicle, etc.), and so forth. The reporting module may be configured to determine revenue metrics for a commercial parking site and process payments for both the customers and the site operators. The access manager may be configured to determine whether to provide access to a commercial parking site and may communicate instructions to the controller of the first system 310.

The third system 330 may include user-facing components, such as a portal, a mobile application, and so forth, which may be used by users to interact with the second system 320 and complete parking reservations.

In this manner, certain embodiments may be configured to automate commercial parking site access, authentication, and inventory management.

Figure 4A:
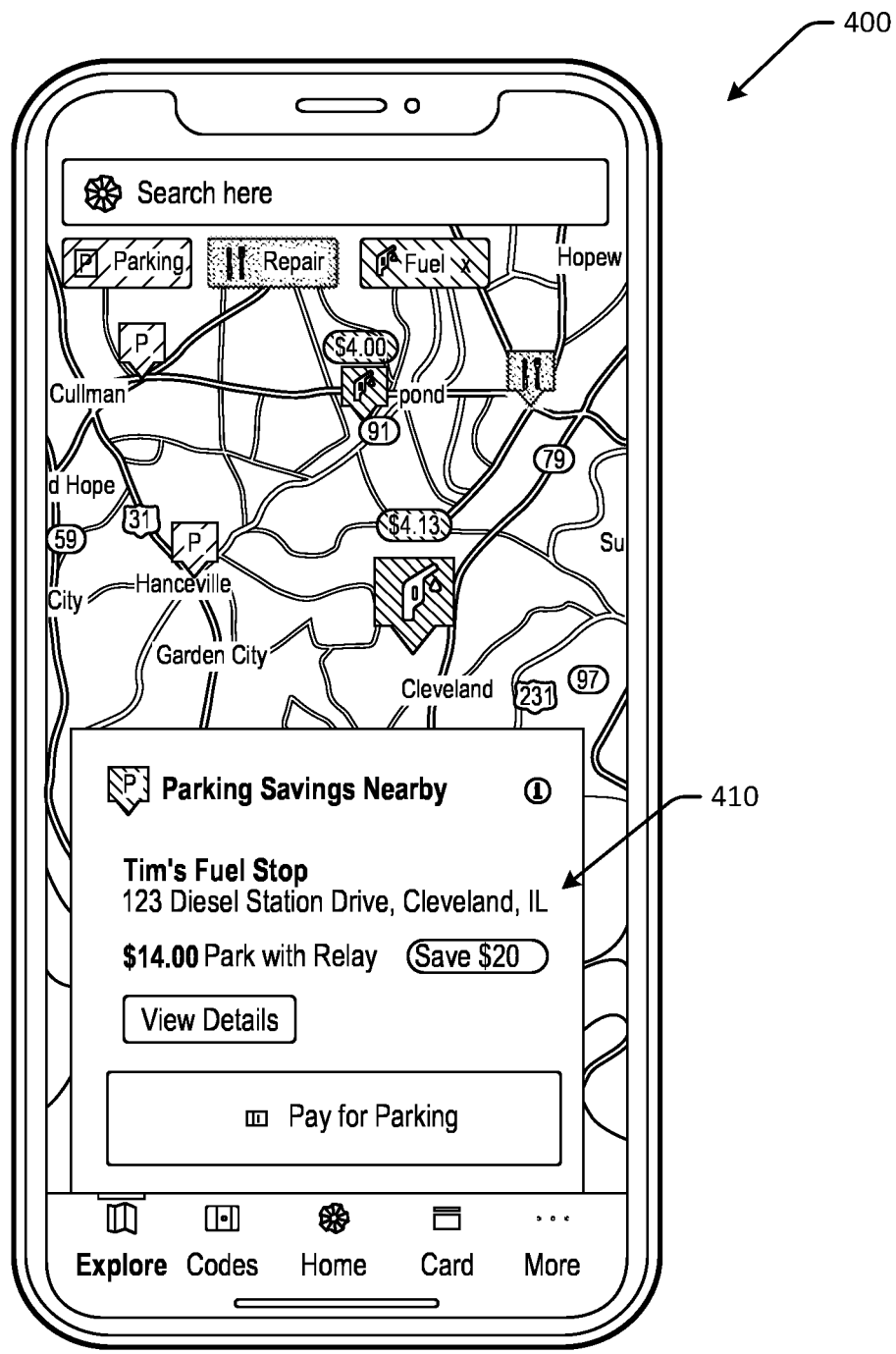
FIGS. 4A-4B are schematic illustrations of example user interfaces for presentation at a user device for automated commercial parking site management in accordance with one or more example embodiments of the disclosure.
Figure 4B:
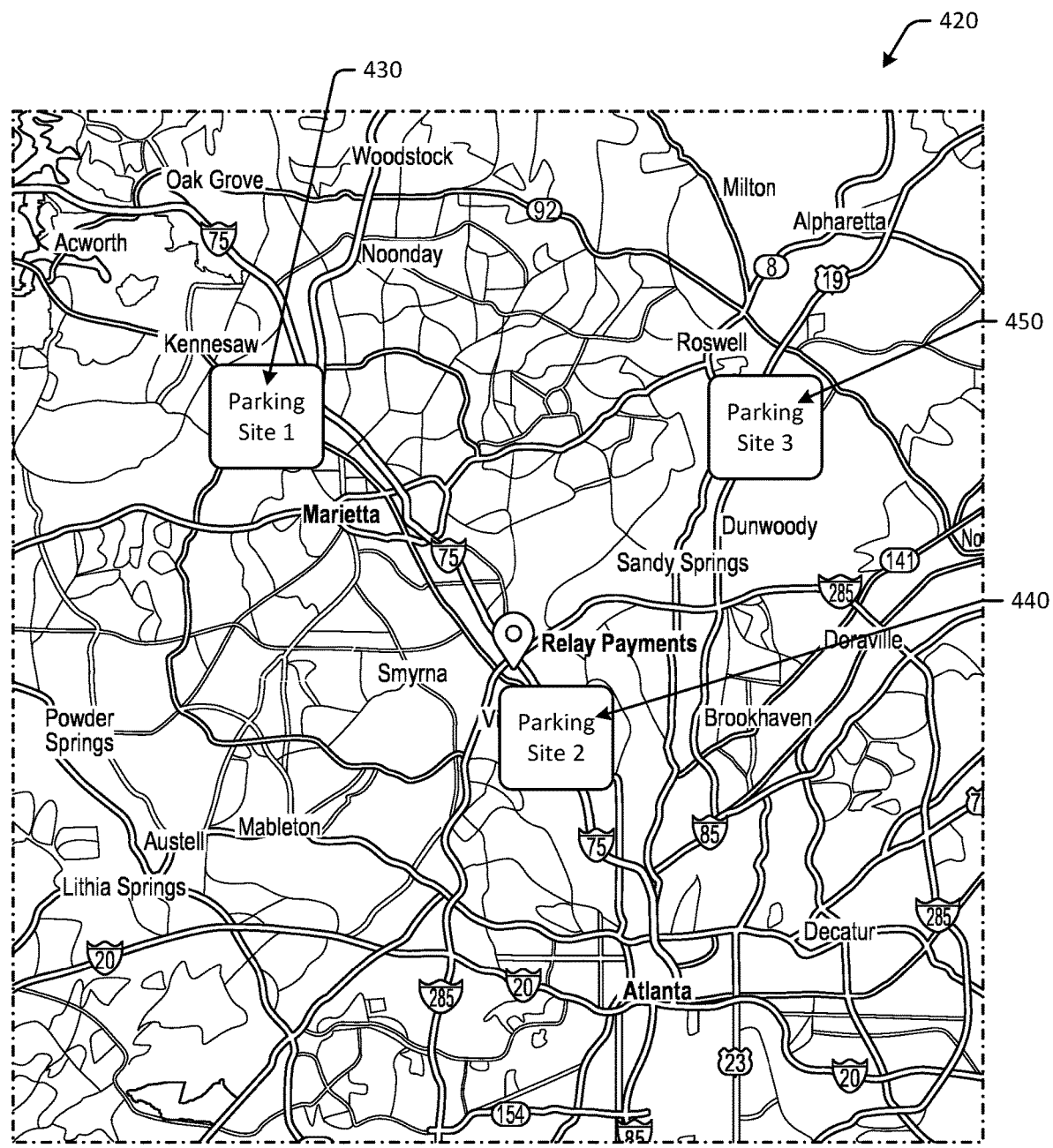

FIGS. 4A-4B are schematic illustrations of example user interfaces for presentation at a user device for automated commercial parking site management in accordance with one or more example embodiments of the disclosure. The examples of FIGS. 4A-4B are for illustrative purposes only. Other embodiments may have different configurations, features, and/or layouts.

In FIG. 4A, a first example user interface 400 is presented. The user interface 400 may be presented at a user device during a search for available nearby parking. For example, the user interface 400 may include a map environment that depicts nearby parking, fuel, and other items. A user may select a commercial parking site using the user interface 400 and initiate a parking reservation process 410. The parking reservation process 410 may include pricing and other information based on vehicle type, parking duration, and other factors. The presented options may be determined not only based on a current location of the user device, but may also be determined based on a direction of travel, a parking timeframe that may be in the future, and/or other factors.

FIG. 4B depicts a second example user interface 420 that may include available parking site locations with inventory, such as a first parking site 430, a second parking site 440, a third parking site 450, and so forth. The different parking sites may have different amenities and/or features, as well as pricing.

In one example embodiment, one or more remote servers may determine real-time parking location inventory and routing. For example, the remote server may determine available inventory associated with a commercial parking site. The remote server may determine that the commercial parking site has a first available parking location, which may be based at least in part on available inventory data associated with the commercial parking site.

In some instances, the commercial parking sites to present at a user interface may be determined based at least in part on a user location. For example, the remote server may determine a location associated with a user device, and may determine or select the commercial parking site for presentation based at least in part on the location.

Some embodiments may account for a direction of travel and/or a destination when determining parking sites to present. For example, the remote server may determine a destination associated with a first request for parking, and may determine or select a commercial parking site based at least in part on the current location of a user device and the destination to which the user is headed.

Additional features, such as discounts for underutilized parking sites, may be determined by the remote server and presented to distribute demand and parking and avoid overflow issues.

Figure 5:
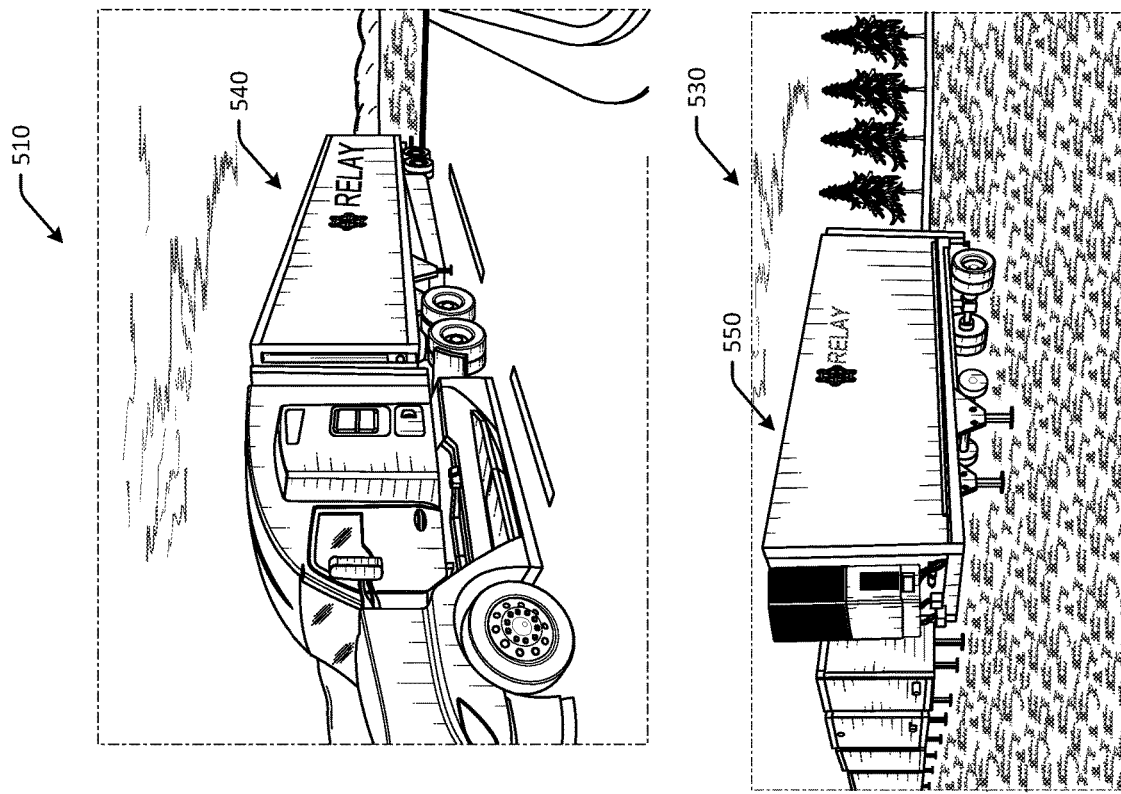
FIG. 5 is a schematic illustration of example commercial parking site layout modeling and corresponding parking location assignment in accordance with one or more example embodiments of the disclosure.
Figure 5:
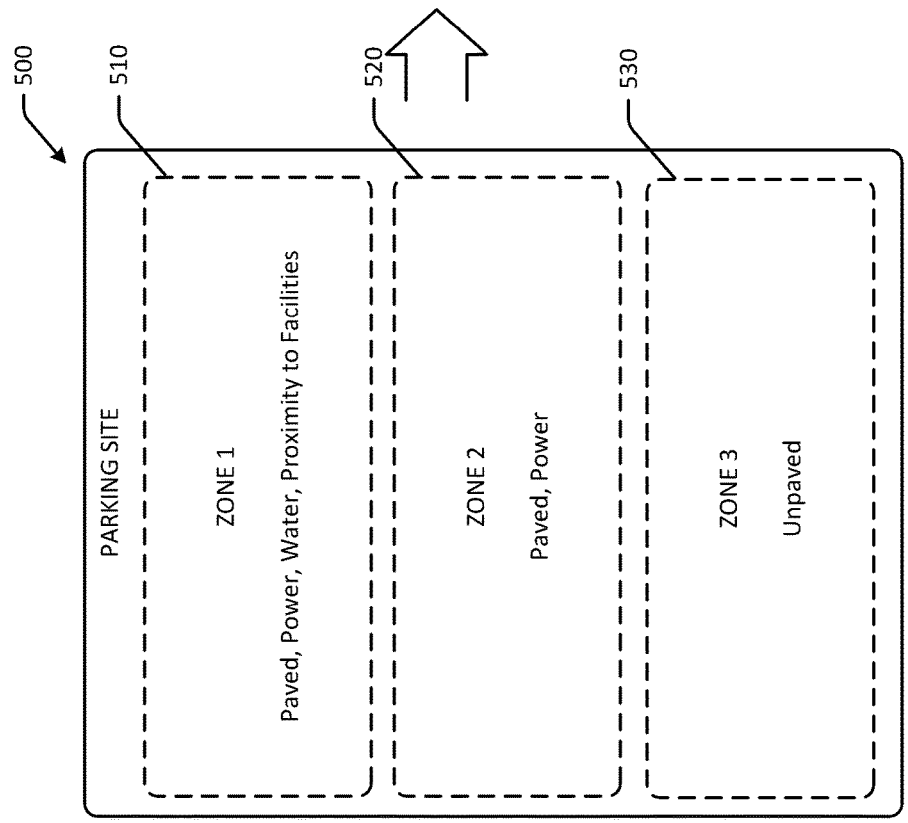

FIG. 5 is a schematic illustration of example commercial parking site layout model 500 and corresponding parking location assignment in accordance with one or more example embodiments of the disclosure. Other embodiments may have different architectures and/or include additional, fewer, or different components.

During an onboarding process for a commercial parking site, the commercial parking site may be virtually modeled to create a digital layout and determine total inventory, different zones where applicable, and so forth. The virtual modeling may be completed using data from a tablet, cameras, imaging, and/or other types of data.

For example, in FIG. 5, the commercial parking site layout model 500 may indicate that the commercial parking site has three discrete parking zones, such as a first zone 510, a second zone 520, and a third zone 530. The different zones may have different features and/or amenities, and therefore different pricing. For example, the first zone 510 may be a paved area having access to power and water, and may be proximate to available facilities, such as showers, restrooms, cafeterias, and so forth. The second zone 520 may be paved and have access to power, but may not include other benefits. The third zone 530 may be an unpaved area without access to power or water, for example. An example of a semi-truck trailer 540 parked in the first zone 510 is presented in FIG. 5, with a paved surface in proximity to power and water connections, as well as a trailer 550 that may be parked in the third zone 530. The third zone 530 may be preferable for long term storage of trailers, long term parking, and so forth. Because the third zone 530 is unpaved, the site conditions may be muddy, subject to flooding, and so forth, and pricing may be adjusted accordingly.

Figure 6A:
FIGS. 6A-6B are schematic illustrations of example user interfaces for presentation at a user device for automated commercial parking inventory management and authentication in accordance with one or more example embodiments of the disclosure.
Figure 6B:
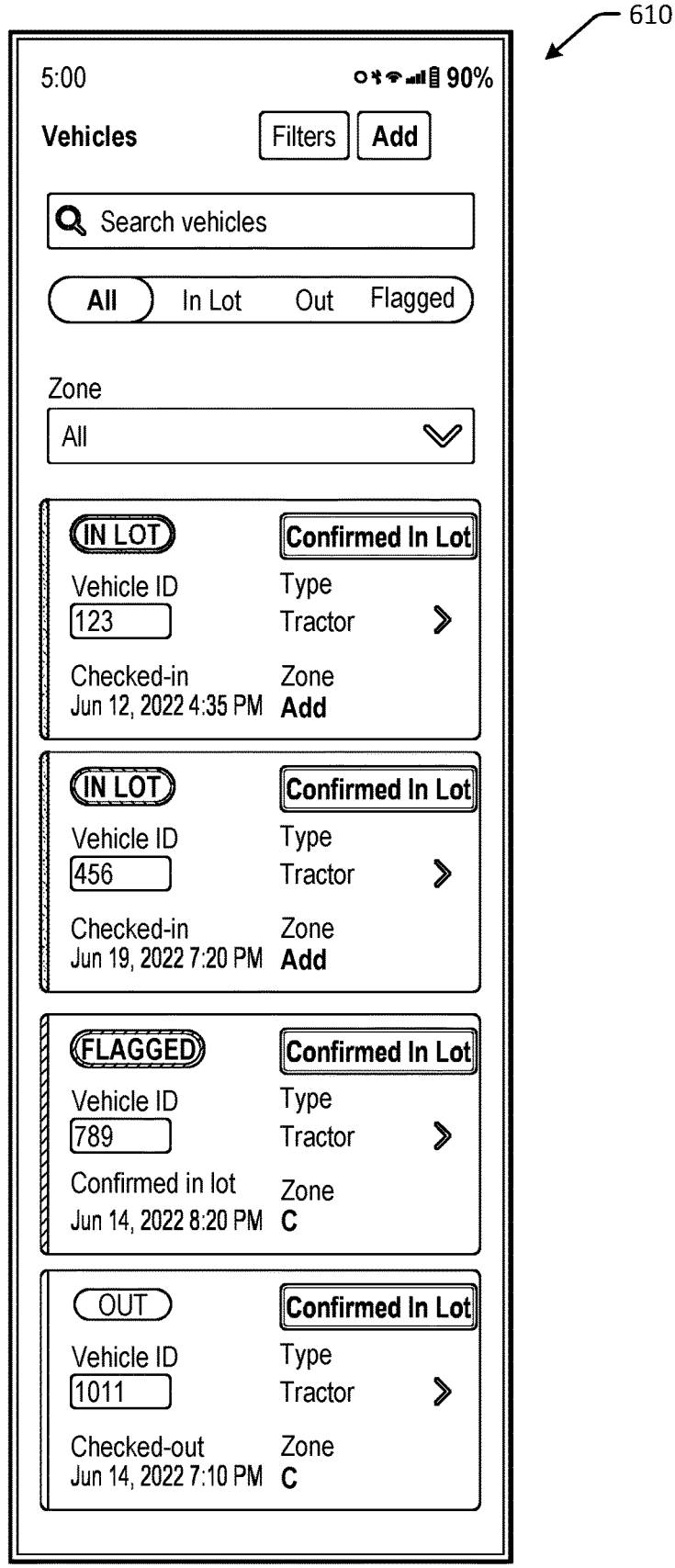

Pricing for the different zones may be different, and authentication or verification may be used to ensure that vehicles are parked in the appropriate zones, as discussed at least with respect to FIGS. 6A-6B.

In some embodiments, the remote server may determine that the commercial parking site has multiple available parking locations, such as a first available parking location in the first zone 510, a second available parking location 520 in the second zone 520, and a third available parking location in the third zone 530 for a tractor and/or trailer. Some of the parking locations may be adjacent to a charging station. The remote server may cause presentation of an option to select the first available parking location, the second parking location, or the third available parking location. The remote server may determine a selection of the first available parking location in one example. The remote server may determine respective costs for the different locations, such as a first cost for the first available parking location, a second cost for the second available parking location, and a third cost for the third available parking location. The remote server may cause presentation of the first cost, the second cost, and the third cost at the user device.

As vehicles and/or containers enter and leave the commercial parking site, the remote server may automatically track such events and, where needed, modify reservations and/or pricing. For example, a user may enter in a semi-truck trailer and leave with just the tractor, indicating the trailer is parked in the lot. The reservation may be adjusted to account for the trailer left behind. In another example, the user may leave a tractor at the site and leave from the site in a personal car. Such events may be automatically determined using one or more sensors, such as cameras, and the remote server may make adjustments to parking reservations accordingly.

For example, a remote server may determine that a tractor associated with a parking reservation is at the commercial parking site, determine that a trailer associated with the parking reservation is at the commercial parking site, and may therefore initiate the first parking reservation. The remote server may determine that the tractor has left the commercial parking site, and may determine that the trailer has left the commercial parking site. The remote server may therefore automatically process a payment for cost of the reservation, where the cost may be equal to what the user was presented with when making the reservation.

In other instances, the remote server may determine that the tractor has left the commercial parking site, and may determine that the trailer has left the commercial parking site. The remote server may determine that a total parking time for the first parking reservation exceeded a maximum allotted time, or that the tractor-trailer overstayed a reservation. The remote server may determine a second cost or an updated cost for the first parking reservation, where the second cost comprises a price adjustment to the originally presented cost, and may automatically process a payment for the second cost.

For instances where the user leaves a trailer or other freight behind, the remote server may determine that the tractor has left the commercial parking site, and may also determine that the trailer is at the commercial parking site. The remote server may determine a second cost or an updated cost for the first parking reservation, where the second cost comprises a price adjustment to the first cost or originally presented cost, unless the parking reservation accounted for the extended parking of the trailer.

To calculate final reservation costs, in one example, the remote server may determine that a tractor has left the commercial parking site, and may determine a first total length of time the tractor was at the commercial parking site. The remote server may determine that the trailer has left the commercial parking site, and may determine a second total length of time the trailer was at the commercial parking site. The remote server may determine a second cost for the first parking reservation, where the second cost comprises a price adjustment to the first cost or originally presented cost associated with the reservation.

FIGS. 6A-6B are schematic illustrations of example user interfaces for presentation at a user device for automated commercial parking inventory management and authentication in accordance with one or more example embodiments of the disclosure. The examples of FIGS. 6A-6B are for illustrative purposes only. Other embodiments may have different configurations, features, and/or layouts.

In FIG. 6A, a first example site operator user interface 600 is presented, where the site operator user interface 600 may be used to present a dashboard of various information related to a particular commercial parking site. The site operator user interface 600 may be used for manual authentication or verification of compliance in embodiments where automated compliance is unavailable (e.g., the commercial parking site does not have cameras positioned about the site, etc.). For example, the site operator may be presented with information related to current, upcoming, and past parking reservations, vehicle and/or freight identification data, aggregated payment data, trends in parking site utilization, and so forth. The operator may use the site operator user interface 600 to flag vehicles and/or freight that is not parked in the correct location. The site operator may use the site operator user interface 600 to confirm that vehicles and/or freight are parked in the correct location and/or are in compliance with a parking reservation.

FIG. 6B depicts a second example site operator user interface 610, in which the operator can view data related to vehicles and/or freight present in the parking site. For example, vehicles that have been confirmed to be in the correct location can be presented, whether confirmed manually or using cameras or other automated equipment. For example, a remote server may use one or more cameras to identify a vehicle, determine a parking location of the vehicle, and compare the parking location to an assigned parking location or zone in order to determine compliance. Vehicles out of compliance may be flagged and/or associated reservations may be automatically updated. For example, if a vehicle is parked in a premium zone (e.g., the first zone 510 of FIG. 5, etc.), but reserved a parking location in a different zone, the reservation may be automatically updated to reflect the premium zone parking cost.

In one example, a remote server may determine a tractor identifier, such as a license plate number, a VIN number, or another identifier associated with the tractor, and may determine a trailer identifier associated with the trailer. Trailer identifiers may be any suitable identifier and may be alphanumeric codes printed on or otherwise associated with the trailer. The remote server may determine, using the tractor identifier and the trailer identifier, that the tractor and the trailer are present at the commercial parking site prior to automatically approving access to the commercial parking site. For example, image data associated with the commercial parking site that may be captured using one or more cameras may be proceed and used to determine the identifiers, and correlation to a parking reservation. Access may be provided after authentication of the parking reservation.

In some embodiments, the remote server may determine a trailer identifier associated with the trailer, and may determine, using the trailer identifier, that the trailer is not present at the commercial parking site. For example, the tractor or trailer may not be associated with a parking reservation, or the reservation may have been made for a different tractor/trailer. For instances with a material size difference for reserved tractor trailers and the tractor trailer that is at the parking site, the remote server may determine a second cost associated with the first parking reservation, and prior to automatically approving access to the commercial parking site, the remote server may cause presentation of a request to confirm the updated second cost for the parking reservation at the user device.

Authentication or verification of compliance may be automated in some embodiments. For example, the remote server may determine, using the parking spot identifier, that the tractor and the trailer are parked in the first available parking location. In other instances, the remote server may determine, using the parking spot identifier, that the tractor and the trailer are parked in an incorrect parking location, and may send a notification to the user device associated with the parking reservation. In some instances, the notification may include a price adjustment notification. One or more sensors, such as cameras or other imaging sensors may be used to determine that a tractor and/or trailer are parked in an incorrect parking location.

Figure 7:
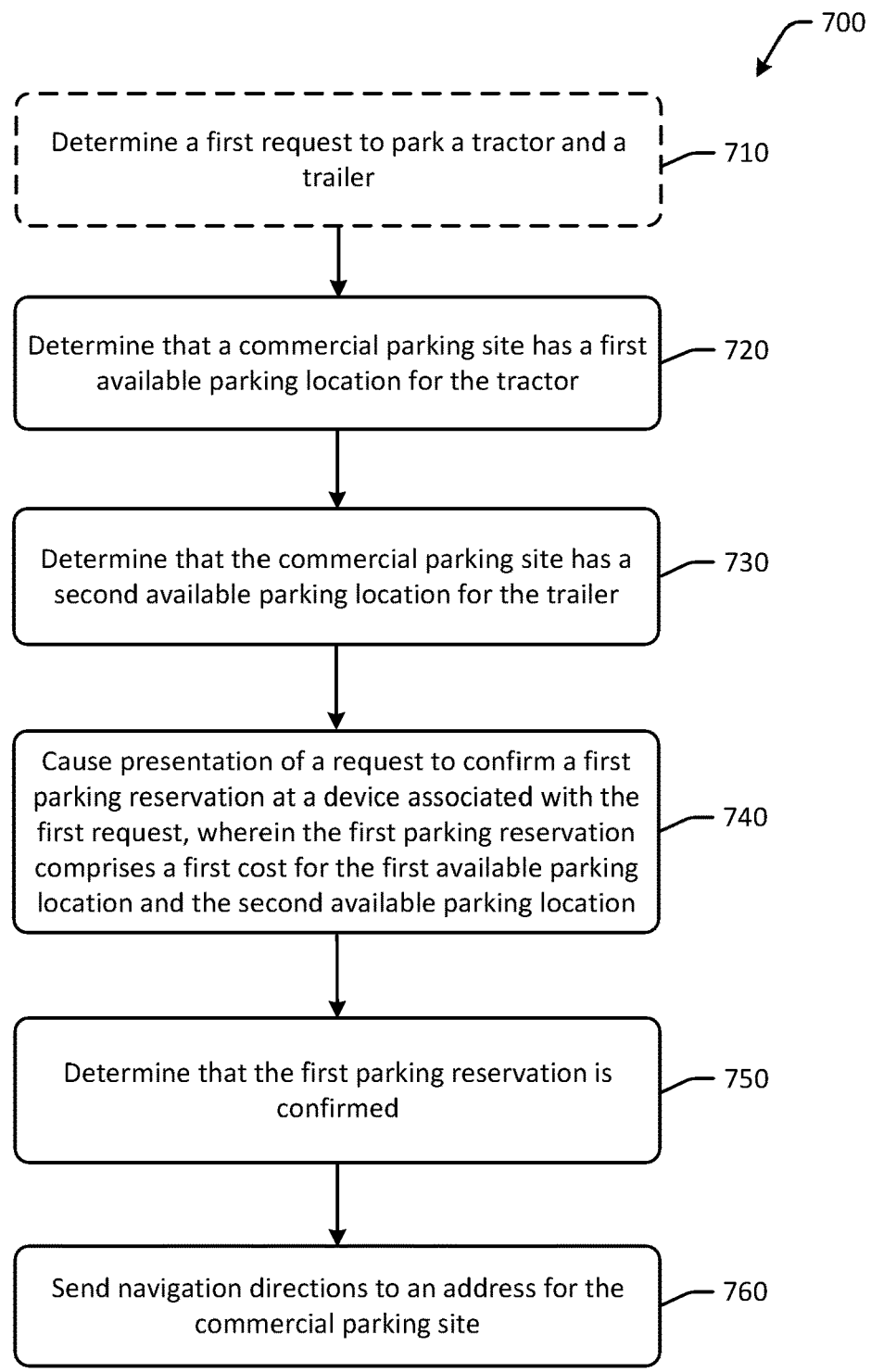
FIG. 7 is a schematic illustration of an example process flow for automated commercial parking site management in accordance with one or more example embodiments of the disclosure.

FIG. 7 depicts an example process flow 700 for automated commercial parking site management in accordance with one or more example embodiments of the disclosure. While example embodiments of the disclosure may be described in the context of tractors and trailers, it should be appreciated that the disclosure is more broadly applicable to any type of commercial equipment parking. Some or all of the blocks of the process flows in this disclosure may be performed in a distributed manner across any number of devices. The operations of the process flow 700 may be optional and may be performed in a different order.

At optional block 710 of the process flow 700, computer-executable instructions stored on a memory of a device, such as a remote server or a user device, may be executed to determine a first request to park a tractor and a trailer. For example, a remote server may determine a first request to park a tractor and a trailer. In some embodiments, the remote server may receive a first request to park a commercial vehicle, such as a tractor, a trailer, farm equipment, containers, or other commercial equipment. In some embodiments, the first request may include user device and/or vehicle location data indicating a current location of the user device or vehicle, and may include a direction of travel and/or destination associated with the user device or vehicle.

At block 720 of the process flow 700, computer-executable instructions stored on a memory of a device may be executed to determine that a commercial parking site has a first available parking location for the tractor. For example, a remote server may determine that a commercial parking site has a first available parking location for the tractor, but not the trailer. To determine that a particular commercial parking site has available inventory at which the tractor can be parked, the remote server may determine a set of candidate commercial parking sites within a certain distance of the user device location (or future location based on direction of travel) and/or destination. In some embodiments, sites may be determined for future reservations and may not consider current user device location (e.g., reservations made 24 hours in advance, etc.). The remote server may determine current available inventory at the commercial parking site, and may determine that there is space to park the tractor.

At block 730 of the process flow 700, computer-executable instructions stored on a memory of a device may be executed to determine that the commercial parking site has a second available parking location for the trailer. For example, a remote server may determine that the commercial parking site has a second available parking location for the trailer. The trailer may therefore be parked at the same commercial parking site as the tractor, but not at the same location in this example. For example, the second available parking location may be non-contiguous with respect to the first available parking location. In other embodiments, tractors and trailers may be parked at different locations within the same commercial parking site.

At block 740, computer-executable instructions stored on a memory of a device may be executed to cause presentation of a request to confirm a first parking reservation at a device associated with the first request, wherein the first parking reservation comprises a first cost for the first available parking location and the second available parking location. For example, the remote server may cause presentation of a request to confirm a first parking reservation at a device associated with the first request, wherein the first parking reservation comprises a first cost for the first available parking location and the second available parking location. The prices may be separated in two in case the user desires to park the trailer and/or tractor at a different commercial parking site. The parking site may be presented to the user at a user device, and the user may confirm that a parking reservation is desired. The parking reservation may include individual pricing for parking the tractor and trailer at the commercial parking site for a predetermined length of time.

In some embodiments, the remote server may determine more than one option for the user to choose from. For example, the commercial parking site may be a first commercial parking site, and the remote server may determine that a second commercial parking site has a second available parking location for the tractor and the trailer. The remote server may cause presentation of a second cost associated with the second available parking location at the device.

At block 750, computer-executable instructions stored on a memory of a device may be executed to determine that the first parking reservation is confirmed. For example, the remote server may determine that the first parking reservation is confirmed. The first parking reservation may be confirmed via interaction with the user device by the user.

At block 760, computer-executable instructions stored on a memory of a device may be executed to send navigation directions to an address for the commercial parking site. For example, the remote server may send navigation directions to an address for the commercial parking site. In some embodiments, the remote server may trigger a message to the user device that includes an address associated with the commercial parking site, and the user may obtain navigation directions. Upon arrival, the remote server may determine that the device and/or tractor/trailer is present at the commercial parking site, and automatically provide access to the commercial parking site.

Figure 8:
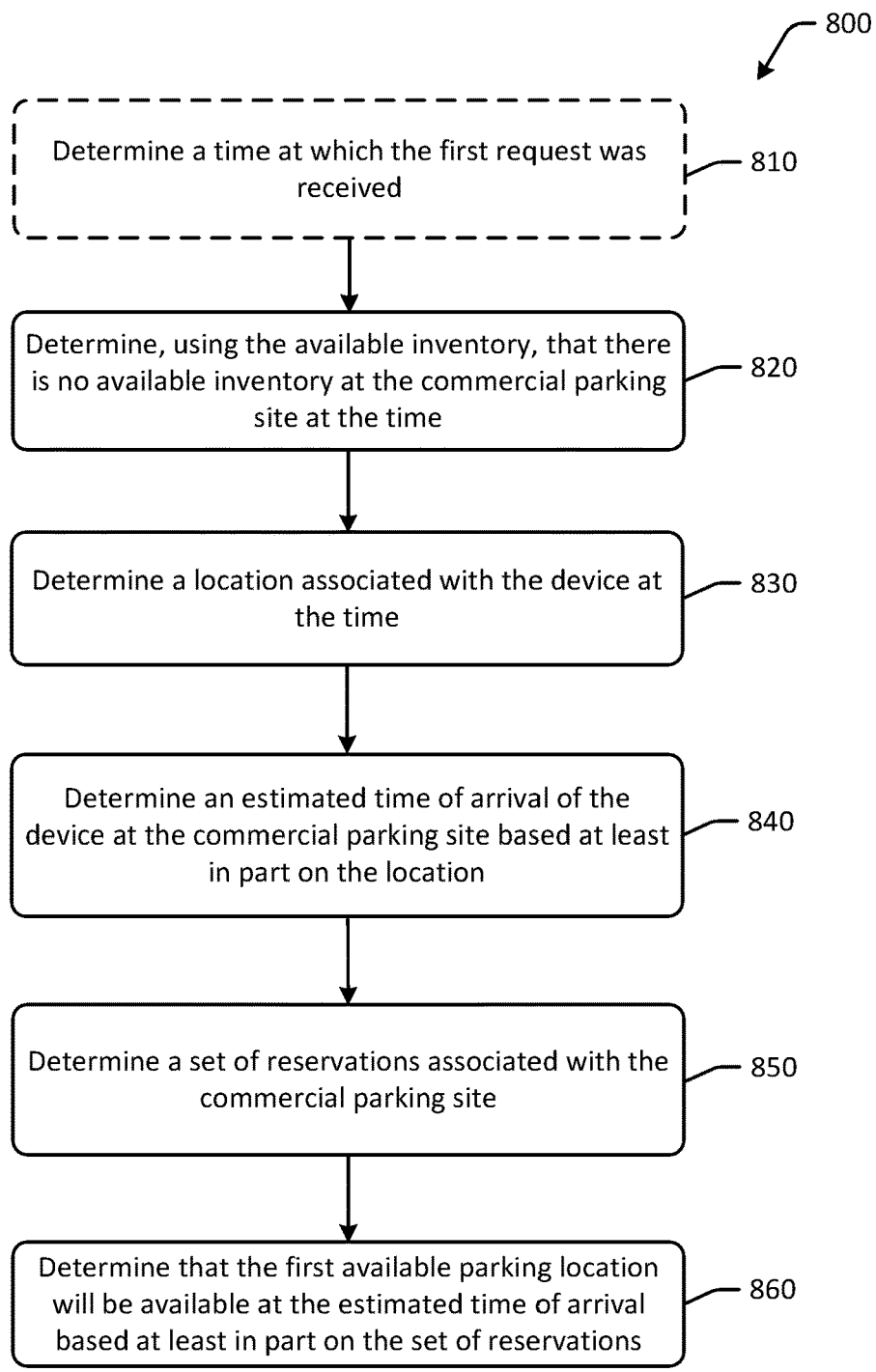
FIG. 8 is a schematic illustration of an example process flow for automated commercial parking site and inventory management in accordance with one or more example embodiments of the disclosure.

FIG. 8 depicts an example process flow 800 for automated commercial parking site and inventory management in accordance with one or more example embodiments of the disclosure. While example embodiments of the disclosure may be described in the context of tractors and trailers, it should be appreciated that the disclosure is more broadly applicable to any type of commercial equipment parking. Some or all of the blocks of the process flows in this disclosure may be performed in a distributed manner across any number of devices. The operations of the process flow 200 may be optional and may be performed in a different order.

At block 810 of the process flow 800, computer-executable instructions stored on a memory of a device, such as a remote server or a user device, may be executed to determine a time at which the first request was received. For example, a remote server may determine a time at which the first request was received. In some embodiments, the remote server may extract a time associated with the first request, which may be a current time, or a time at which a parking reservation is desired, such as a time in the future.

At block 820 of the process flow 800, computer-executable instructions stored on a memory of a device may be executed to determine, using the available inventory, that there is no available inventory at the commercial parking site at the time. For example, a remote server may determine, using the available inventory, that there is no available inventory at the commercial parking site at the time. At a current point in time, a commercial parking site may be at capacity and may not have availability to park another tractor and/or trailer. However, embodiments may address this by accounting for reservations that may end (and inventory that may come available) prior to the time the reservation associated with the first request is to begin.

At block 830 of the process flow 200, computer-executable instructions stored on a memory of a device may be executed to determine a location associated with the device at the time. For example, a remote server may determine a location associated with the device at the time. A location of the device from which the first request was made may be determined at the time at which the first request was submitted.

At block 840, computer-executable instructions stored on a memory of a device may be executed to determine an estimated time of arrival of the device at the commercial parking site based at least in part on the location. For example, the remote server may determine an estimated time of arrival of the device at the commercial parking site based at least in part on the location. The device location at the time the request was made may be used to calculate an approximate time the device (and vehicle) will arrive at the designated commercial parking site.

At block 850, computer-executable instructions stored on a memory of a device may be executed to determine a set of reservations associated with the commercial parking site. For example, the remote server may determine a set of reservations associated with the commercial parking site. In some embodiments, the set of reservations may include reservations slated to end at or before the estimated time of arrival of the device and/or vehicle to the commercial parking site.

At block 860, computer-executable instructions stored on a memory of a device may be executed to determine that the first available parking location will be available at the estimated time of arrival based at least in part on the set of reservations. For example, the remote server may determine that the first available parking location will be available at the estimated time of arrival based at least in part on the set of reservations. In some embodiments, the remote server may determine that another tractor and/or trailer will leave before the estimated time of arrival, and therefore, the commercial parking site can accommodate a new reservation. In this manner, occupancy of the commercial parking site can be increased, and additional functionality due to the integration of location and traffic data with the parking site inventory is provided.

Figure 9:
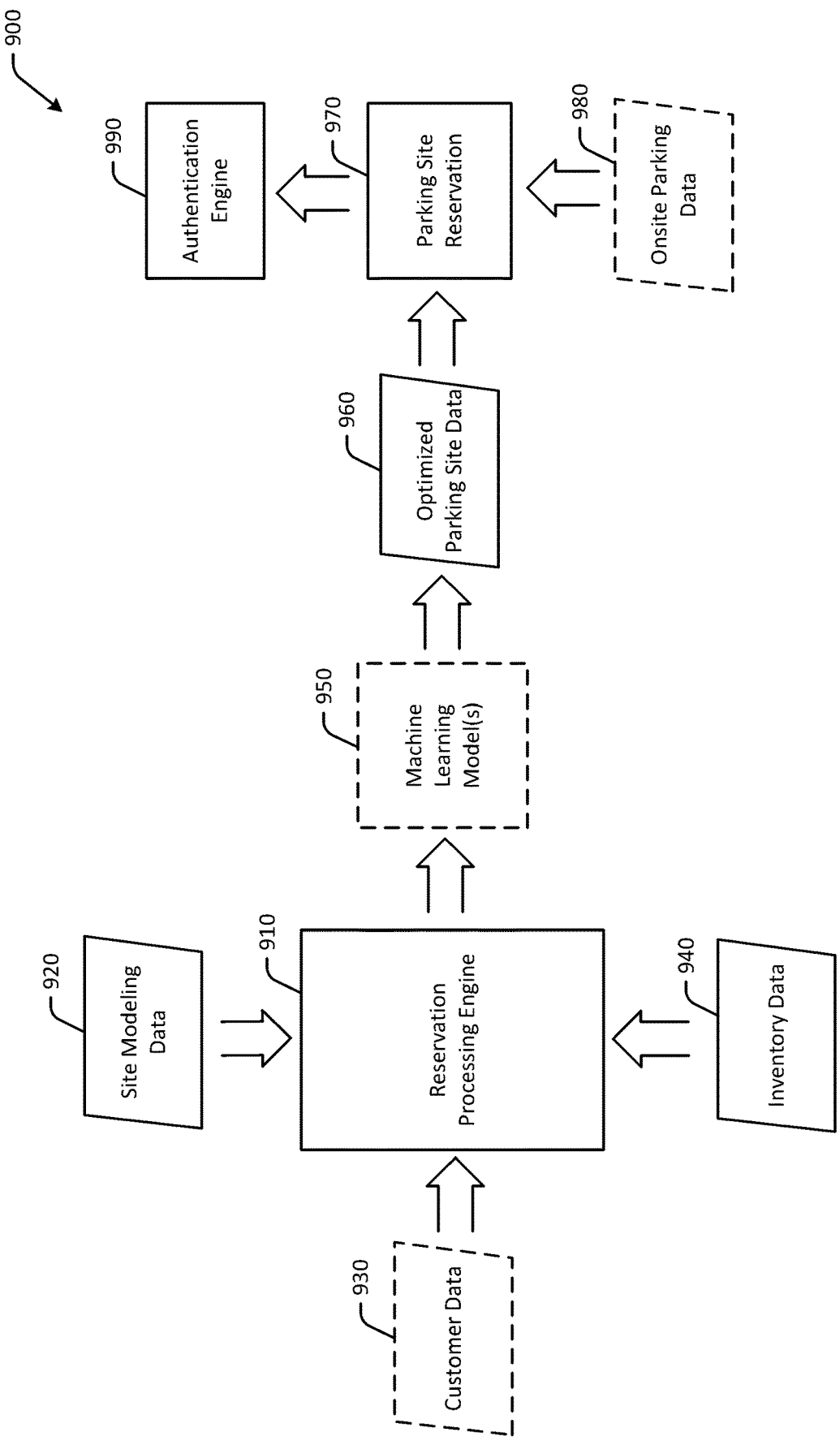
FIG. 9 schematically illustrates an example data flow for automated commercial parking site and inventory management in accordance with one or more example embodiments of the disclosure.

FIG. 9 schematically illustrates an example data flow 900 for automated commercial parking site and inventory management in accordance with one or more example embodiments of the disclosure. Different embodiments may include different, additional, or fewer inputs or outputs than those illustrated in the example of FIG. 9.

In FIG. 9, an example data flow 900 is schematically depicted. A reservation processing engine 910 may be stored at and/or executed by one or more remote servers. The reservation processing engine 910 may include one or more modules or algorithms, and may be configured to determine requests for parking reservations. For example, the reservation processing engine 910 may receive requests for parking reservation information from one or more user devices. To determine available parking inventory and pricing, the reservation processing engine 910 may receive one or more additional data inputs. For example, the reservation processing engine 910 may receive site modeling data 920, which may indicate a virtual model of a commercial parking site that represents the total available parking at a particular commercial parking site. The reservation processing engine 910 may receive inventory data 940, which may indicate current and upcoming reservations associated with a particular commercial parking site. The reservation processing engine 910 may receive optional customer data 930, which may include the parking request and information such as the vehicle and/or trailer for which the parking reservation is being made, a current location of the vehicle or user device sending the request, a destination or direction of travel of the user device, and so forth.

The reservation processing engine 910 may output candidate commercial parking site locations and corresponding pricing to an optional machine learning model(s) 950. The machine learning model(s) 950 may be used to determine whether to adjust any of the candidate commercial parking site locations based at least in part on a direction of travel of the user device and/or vehicle, as well as to account for overflowing of certain commercial parking sites. For example, if a certain commercial parking site is nearing capacity, the machine learning model(s) 950 may determine that a nearby commercial parking site that is under capacity may be ranked first for presentation to the user, and/or the machine learning model(s) 950 may determine that a discount is to be applied to pricing for the nearby commercial parking site to drive traffic to the nearby commercial parking site instead of the site that is at capacity. In addition, the machine learning model(s) 950 may be used to determine dynamic pricing for reservations, such as pricing determined based at least in part on one or more factors that may include commercial parking site utilization values, maximum yield per acreage metrics, current or inbound weather conditions (e.g., rain may cause prices to increase, etc.), and other factors may be used to determine the pricing and/or cost for a particular reservation. The machine learning model(s) 950 may output optimized parking site data 960 that may include a ranked set of candidate commercial parking site options for presentation to a user. In some embodiments, the optimized parking site data 960 may include dynamic pricing for different zones within a commercial parking site, such as those discussed with respect to at least FIG. 5.

The optimized parking site data 960 may be presented at a user device, and the user device may be used to select an option. The selected option may be used to create a parking site reservation 970. The parking site reservation 970 may be used to authenticate the user device and/or vehicle upon arrival at the commercial parking site. In some embodiments, a remote server may use the parking site reservation 970 in conjunction with optional onsite parking data 980 to assign a parking location to a reservation. For example, the onsite parking data 980 may include occupied location data that reflects currently occupied parking locations. The remote server may use the data to assign a parking location to the user. The parking site reservation 970 may be input at an authentication engine 990 to confirm the vehicle is parked in the correct location after parking in complete, as discussed with respect to at least FIGS. 6A-6B.

As a result, end-to-end processing of parking site reservation, access to parking sites, and compliance verification or authentication may be completed in an automated manner. In some embodiments, the system may receive feedback data, where the feedback data includes an indication that a user did not select a first ranked candidate commercial parking option. The system may use the feedback data associated with the rankings to retrain the machine learning model(s).

One or more operations of the methods, process flows, or use cases of FIGS. 1-9 may have been described above as being performed by a user device, or more specifically, by one or more program module(s), applications, or the like executing on a device. It should be appreciated, however, that any of the operations of the methods, process flows, or use cases of FIGS. 1-9 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-9 may be described in the context of the illustrative devices, it should be appreciated that such operations may be implemented in connection with numerous other device configurations.

The operations described and depicted in the illustrative methods, process flows, and use cases of FIGS. 1-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 10:
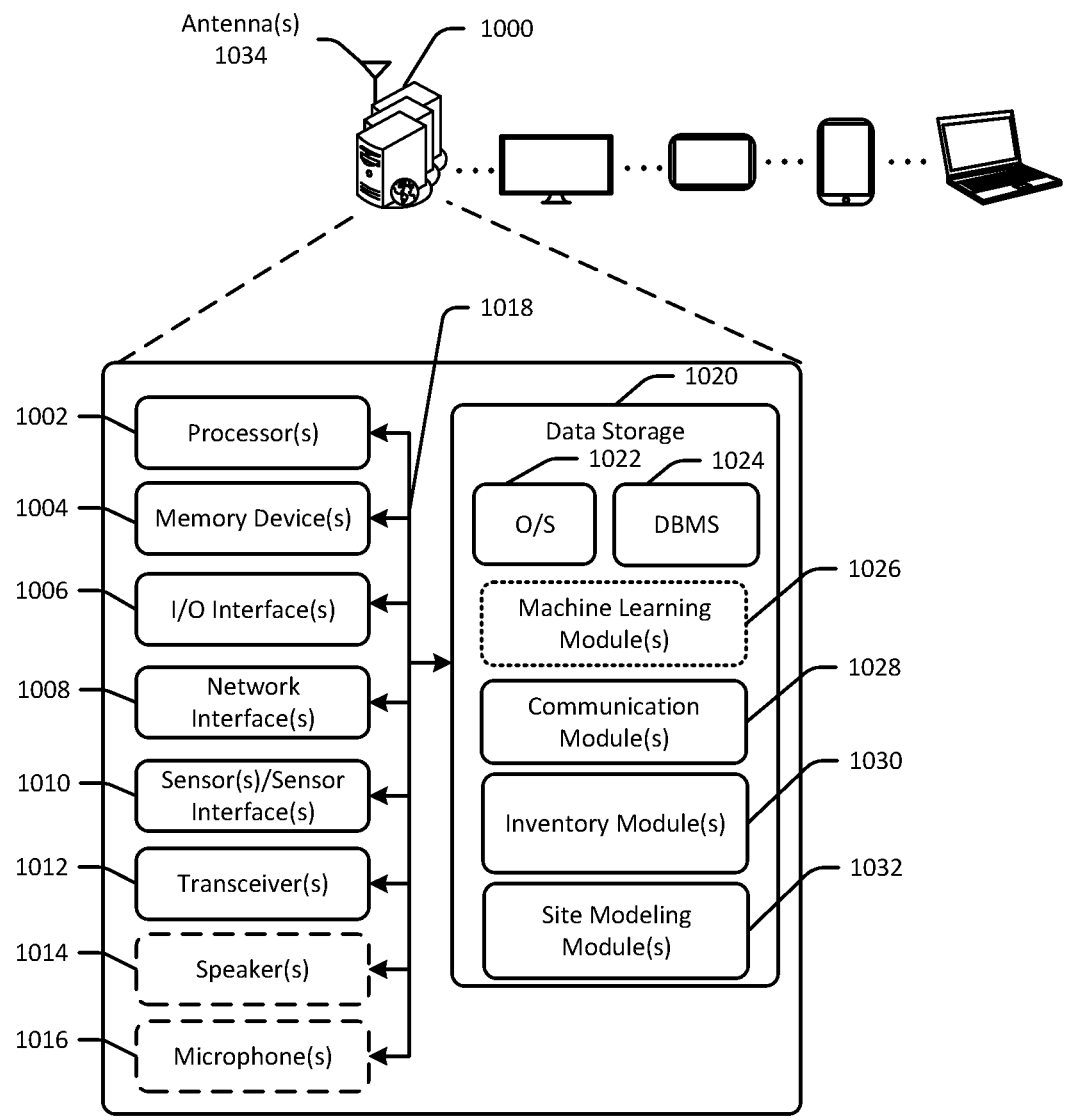
FIG. 10 is a schematic block diagram of an illustrative device in accordance with one or more example embodiments of the disclosure.

FIG. 10 is a schematic block diagram of an illustrative remote server 1000 in accordance with one or more example embodiments of the disclosure. The remote server 1000 may include any suitable computing device capable of receiving and/or generating data including, but not limited to, a mobile device such as a smartphone, tablet, e-reader, wearable device, or the like; a desktop computer; a laptop computer; or the like. The remote server 1000 may correspond to an illustrative device configuration for the devices of FIGS. 1-9.

The remote server 1000 may be configured to communicate via one or more networks with one or more servers, search engines, user devices, or the like. In some embodiments, a single remote server or single group of remote servers may be configured to perform more than one type of correlation and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 1000 may include one or more processors (processor(s)) 1002, one or more memory devices 1004 (generically referred to herein as memory 1004), one or more input/output (I/O) interface(s) 1006, one or more network interface(s) 1008, one or more sensors or sensor interface(s) 1010, one or more transceivers 1012, one or more optional speakers 1014, one or more optional microphones 1016, and data storage 1020. The remote server 1000 may further include one or more buses 1018 that functionally couple various components of the remote server 1000. The remote server 1000 may further include one or more antenna(s) 1034 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the remote server 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the remote server 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more database management systems (DBMS) 1024; and one or more program module(s), applications, engines, computer-executable code, scripts, or the like such as, for example, one or more machine learning module(s) 1026, one or more communication module(s) 1028, one or more inventory module(s) 1030, and/or one or more site modeling module(s) 1032. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the remote server 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, the datastore(s) may include, for example, user preference information, customer and/or parking site information, user profile information, and other information.

The processor(s) 1002 may be configured to access the memory 1004 and execute computer-executable instructions loaded therein. For example, the processor(s) 1002 may be configured to execute computer-executable instructions of the various program module(s), applications, engines, or the like of the remote server 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the machine learning module(s) 1026 may include computer-executable instructions, code, or the like that responsive to execution by one or more of the processor(s) 1002 may perform functions including, but not limited to, determining training data sets, determining model accuracy, generating one or more machine learning models or algorithms, determining parking assignments, determining parking site routing, and the like.

The communication module(s) 1028 may include computer-executable instructions, code, or the like that responsive to execution by one or more of the processor(s) 1002 may perform functions including, but not limited to, communicating with one or more devices, for example, via wired or wireless communication, communicating with remote servers, communicating with remote datastores, sending or receiving notifications or parking site results, communicating with cache memory data, and the like.

The inventory module(s) 1030 may include computer-executable instructions, code, or the like that responsive to execution by one or more of the processor(s) 1002 may perform functions including, but not limited to, determining current parking site inventory data, determining or analyzing authentication data, identifying vehicles and/or equipment at a parking site location, and the like.

The site modeling module(s) 1032 may include computer-executable instructions, code, or the like that responsive to execution by one or more of the processor(s) 1002 may perform functions including, but not limited to, determining parking site layout, aggregating parking site data, generating digital parking site maps, and the like.

Referring now to other illustrative components depicted as being stored in the data storage 1020, the O/S 1022 may be loaded from the data storage 1020 into the memory 1004 and may provide an interface between other application software executing on the remote server 1000 and hardware resources of the remote server 1000. More specifically, the O/S 1022 may include a set of computer-executable instructions for managing hardware resources of the remote server 1000 and for providing common services to other application programs (e.g., managing memory allocation among various application programs). The O/S 1022 may include any operating system now known or which may be developed in the future including, but not limited to, any server operating system, any mainframe operating system, or any other proprietary or non-proprietary operating system.

The DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 1000 is a mobile device, the DBMS 1024 may be any suitable light-weight DBMS optimized for performance on a mobile device.

Referring now to other illustrative components of the remote server 1000, the input/output (I/O) interface(s) 1006 may facilitate the receipt of input information by the remote server 1000 from one or more I/O devices as well as the output of information from the remote server 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(s) 1034 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 1000 may further include one or more network interface(s) 1008 via which the remote server 1000 may communicate with any of a variety of other systems, platforms, networks, devices, and so forth. The network interface(s) 1008 may enable communication, for example, with one or more wireless routers, one or more host servers, one or more web servers, and the like via one or more of networks.

The antenna(s) 1034 may include any suitable type of antenna depending, for example, on the communications protocols used to transmit or receive signals via the antenna(s) 1034. Non-limiting examples of suitable antennas may include directional antennas, non-directional antennas, dipole antennas, folded dipole antennas, patch antennas, multiple-input multiple-output (MIMO) antennas, or the like. The antenna(s) 1034 may be communicatively coupled to one or more transceivers 1012 or radio components to which or from which signals may be transmitted or received.

As previously described, the antenna(s) 1034 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 1034 may additionally, or alternatively, include a Wi-Fi antenna configured to transmit or receive signals in accordance with established standards and protocols, such as the IEEE 802.11 family of standards, including via 2.4 GHZ channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 1034 may be configured to transmit or receive radio frequency signals within any suitable frequency range forming part of the unlicensed portion of the radio spectrum.

The antenna(s) 1034 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(s) 1034—transmitting or receiving radio frequency (RF) signals in the bandwidth and/or channels corresponding to the communications protocols utilized by the remote server 1000 to communicate with other devices. The transceiver(s) 1012 may include hardware, software, and/or firmware for modulating, transmitting, or receiving—potentially in cooperation with any of antenna(s) 1034—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the remote server 1000. The transceiver(s) 1012 may further include a low noise amplifier (LNA), additional signal amplifiers, an analog-to-digital (A/D) converter, one or more buffers, a digital baseband, or the like.

The sensor(s)/sensor interface(s) 1010 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 1014 may be any device configured to generate audible sound. The optional microphone(s) 1016 may be any device configured to receive analog sound input or voice data.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 1000, and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the remote server 1000 may include alternate and/or additional hardware, software, or firmware components beyond those described or depicted without departing from the scope of the disclosure. More particularly, it should be appreciated that software, firmware, or hardware components depicted as forming part of the remote server 1000 are merely illustrative and that some components may not be present or additional components may be provided in various embodiments. While various illustrative program module(s) have been depicted and described as software module(s) stored in data storage 1020, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more processors coupled to memory, a first request to park a tractor and a trailer, wherein the first request comprises a first device location of a mobile device;
   determining that a commercial parking site has a first available parking location for the tractor and the trailer;
   causing presentation of a request to confirm a first parking reservation at the mobile device from which the first request was received, wherein the first parking reservation comprises a first cost associated with the first available parking location;
   determining, using a first sensor, a tractor identifier is present at the commercial parking site;
   determining that the tractor identifier is associated with the tractor;
   determining, using the first sensor or a second sensor, a trailer identifier is present at the commercial parking site;
   determining that the trailer identifier is associated with the trailer;
   based on determining that the tractor identifier and the trailer identifier are present at the commercial parking site, automatically causing an access gate at the commercial parking site to open;
   determining, at a second time interval and using the trailer identifier, that the trailer is not present at the commercial parking site;
   determining a second cost associated with the first parking reservation; and
   causing presentation of a request to confirm the second cost for the first parking reservation at the mobile device.

2. The method of claim 1, further comprising:
   determining available inventory associated with the commercial parking site;
   wherein determining that the commercial parking site has the first available parking location comprises determining that the commercial parking site has the first available parking location based at least in part on the available inventory.

3. The method of claim 2, further comprising:
   determining a time at which the first request was received;
   determining, using the available inventory, that there is no available inventory at the commercial parking site at the time;
   determining a location associated with the mobile device at the time;
   determining an estimated time of arrival of the mobile device at the commercial parking site based at least in part on the location;
   determining a set of reservations associated with the commercial parking site; and
   determining that the first available parking location will be available at the estimated time of arrival based at least in part on the set of reservations.

4. The method of claim 1, further comprising:
   determining that the tractor and the trailer have passed the access gate; and
   automatically causing the access gate to close.

5. The method of claim 1, further comprising:
   determining a parking spot identifier associated with the first available parking location; and
   causing presentation of the parking spot identifier at the mobile device.

6. The method of claim 5, further comprising:
   determining, using the parking spot identifier, that the tractor and the trailer are parked in the first available parking location.

7. The method of claim 5, further comprising:
   determining, using the parking spot identifier, that the tractor and the trailer are parked in an incorrect parking location; and
   sending a notification to the mobile device.

8. The method of claim 7, wherein the notification comprises a price adjustment notification.

9. The method of claim 7, wherein determining that the tractor and the trailer are parked in an incorrect parking location comprises determining that the tractor and the trailer are parked in an incorrect parking location using one or more sensors.

10. The method of claim 1, wherein the commercial parking site is a first commercial parking site, the method further comprising:
   determining that a second commercial parking site has a second available parking location for the tractor and the trailer; and
   causing presentation of a second cost associated with the second available parking location at the mobile device.

11. The method of claim 1, wherein determining the commercial parking site comprises determining the commercial parking site based at least in part on the first device location.

12. The method of claim 1, further comprising:
   determining a destination associated with the first request;
   wherein determining the commercial parking site comprises determining the commercial parking site based at least in part on the first device location and the destination.

13. The method of claim 1, wherein the first sensor is a camera sensor.

14. A system comprising:
   memory comprising computer-executable instructions; and
   one or more computer processors configured to access the memory and execute the computer-executable instructions to:
      determine a first request to park a tractor and a trailer, wherein the first request comprises a first device location of a mobile device;
      determine that a commercial parking site has a first available parking location for the tractor and the trailer;
      cause presentation of a request to confirm a first parking reservation at the mobile device from which the first request was received, wherein the first parking reservation comprises a first cost associated with the first available parking location;
      determining, using a first sensor, a tractor identifier is present at the commercial parking site;
      determining that the tractor identifier is associated with the tractor;
      determining, using the first sensor or a second sensor, a trailer identifier is present at the commercial parking site;
      determining that the trailer identifier is associated with the trailer;
      based on determining that the tractor identifier and the trailer identifier are present at the commercial parking site, automatically causing an access gate at the commercial parking site to open;
      determine a time at which the first request was received;
      determine that there is no available inventory at the commercial parking site at the time;
      determine a location associated with the mobile device at the time;
      determine an estimated time of arrival of the mobile device at the commercial parking site based at least in part on the location;
      determine a set of reservations associated with the commercial parking site; and
      determine that the first available parking location will be available at the estimated time of arrival based at least in part on the set of reservations.

15. The system of claim 14, wherein the one or more computer processors are further configured to access the memory and execute the computer-executable instructions to:
   determine, at a second time interval and using the trailer identifier, that the trailer is not present at the commercial parking site;
   determine a second cost associated with the first parking reservation; and
   cause presentation of a request to confirm the second cost for the first parking reservation at the mobile device.

16. The system of claim 14, wherein the one or more computer processors are further configured to access the memory and execute the computer-executable instructions to:
   determine that the tractor and the trailer are parked in an incorrect parking location; and
   send a price adjustment notification to the mobile device.

17. The system of claim 14, wherein the commercial parking site is a first commercial parking site, and wherein the one or more computer processors are further configured to access the memory and execute the computer-executable instructions to:
   determine that a second commercial parking site has a second available parking location for the tractor and the trailer; and
   cause presentation of a second cost associated with the second available parking location at the mobile device.

18. The system of claim 14, wherein the first sensor is a camera sensor.

* * * * *